May 17, 1966 W. E. BELL ET AL 3,251,997

OPTICAL COMMUNICATION SYSTEM

Filed Feb. 10, 1961

INVENTORS
WILLIAM E. BELL
ARNOLD L. BLOOM
BY Wm. J. Nolan
ATTORNEY

United States Patent Office 3,251,997
Patented May 17, 1966

3,251,997

OPTICAL COMMUNICATION SYSTEM

William E. Bell, Palo Alto, and Arnold L. Bloom, Menlo Park, Calif., assignors to Varian Associates, Palo Alto, Calif., a corporation of California Filed Feb. 10, 1961, Ser. No. 88,366
10 Claims. (Cl. 250—199)

The present invention relates in general to optical communication, and more particularly to a novel secure optical communication system in which information is transmitted by frequency modulating a light beam.

In order to provide an optical communication system with reasonable range, sensitivity, and ruggedness of construction, it has usually been the practice to transmit information by amplitude modulating a light beam. Such a beam is very susceptible to unauthorized interception, as the information can be detected with ordinary type photocells. Previously proposed devices for overcoming this problem which utilize, for example, delicate interference-type laboratory equipment or broad spectral range light sources are in general too cumbersome and inefficient for practical instrumentation.

Thus, it is the principal object of the present invention to provide a simple and efficient secure optical communication system.

One feature of the present invention is the provision of an optical communication system in which information is transmitted by frequency modulating a beam of optical resonance radiation, and is detected by a photosensitive element containing a plasma responsive only to the wavelengths of the resonance radiation.

Another feature of the present invention is the provision of an optical communication system in accordance with the previous paragraph in which the detected wavelength is above the visible range.

Figure 1:
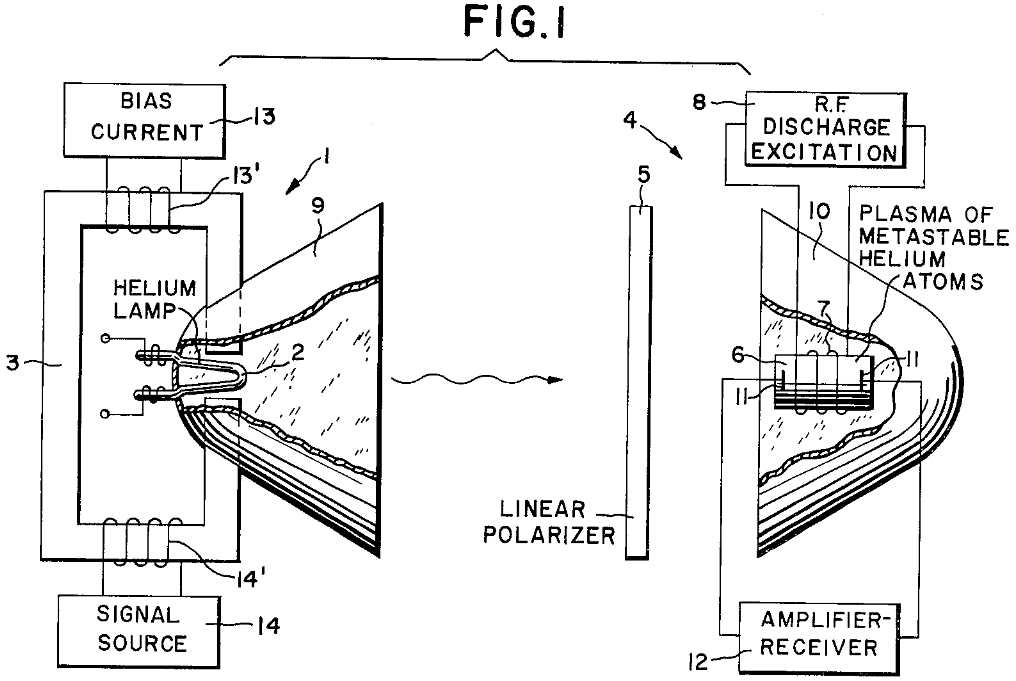
Figure 2:
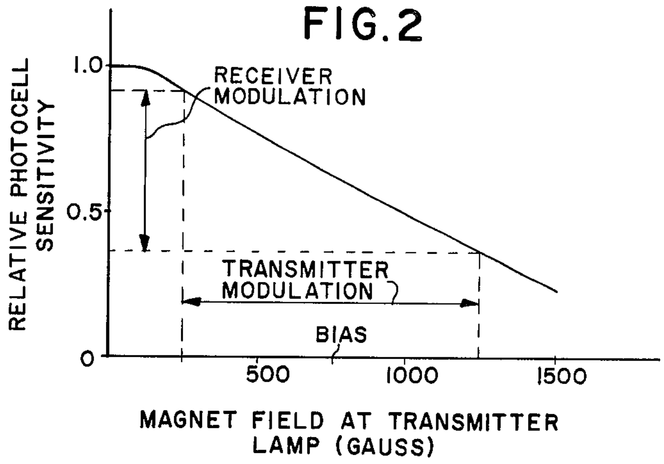

These and other features and advantages of the present invention will become more apparent after a perusal of the following specification taken in connection with the accompanying drawings wherein FIG. 1 is a diagram of an optical communication system in accordance with the present invention, and FIG. 2 is a plot of the signal response for the system shown in FIG. 1.

In accordance with the present invention it has been discovered that the conductivity of a plasma of metastable atoms or molecules is greatly affected when irradiated by a transmitting beam of optical resonance radiation of the same substance as that contained in the plasma, and that the response of this photo-sensitive plasma sharply decreases when the frequency of the incident radiation is shifted slightly so that information frequency modulated on the transmitting beam may be readily retrieved.

Referring in particular to the example of the present invention shown in FIG. 1, the transmitter 1 comprising an intense helium lamp 2, which may conveniently be of the type wherein a radio frequency voltage is applied to external electrodes at the ends of an elongated and centrally constricted discharge tube, provides a beam of infra-red resonance radiation at a wavelength of 20,581 angstroms (approximately two microns). The lamp 2 is placed in the gap magnetic field of a ferrite magnet 3 thereby splitting the optical resonance radiation line propagated in a direction perpendicular to the field into three separate lines in accordance with the well-known Zeeman effect. The central line is at the original frequency and is plane polarized parallel to the field. The other two lines are polarized perpendicular to the field, and shifted in frequency by an amount proportional to the magnetic field intensity at the lamp.

At the receiver end 4, a linear polarizer 5 removes the unshifted line, and the perpendicularly polarized fielddependent lines are allowed to irradiate a glass vessel 6 which contains low pressure helium gas maintained at a soft or barely self-sustaining glow discharge condition by the magnetic field of radio frequency coil 7 coupled to a radio frequency oscillator 8. This discharge maintains a concentration of metastable atoms which undergo ionizing collisions. The collection efficiency of the transmitting beam is optimized by parabolic transmitting and receiving reflectors 9 and 10, and by a suitable lens system (not shown). The two-micron radiation raises the helium atoms in vessel 6 to a non-metastable state from which they rapidly decay to the ground state, thereby depopulating the metastable state and reducing the conductivity of the plasma as monitored by a pair of charge-collecting electrodes 11 coupled to an amplifier-receiver unit 12.

Referring now to FIG. 2, there is shown a plot of the relative amplitude of the photocell signal derived from the collecting electrodes 11 as a function of the magnetic field at the transmitter lamp 2. For a bias field of 750 gauss (established by current source 13 through magnet yoke winding 13′), a signal field amplitude of 500 gauss (established over a substantially linear response region by current source 14 through winding 14′) is seen to yield approximately a 60% modulation in the received signal. The total intensity of the transmitted light beam, however, is found to remain substantially constant over this range of field variation.

Thus, in operation, a suitable bias field is applied by source 13 to provide discriminator-type operation on the sloping portion of the response curve of the receiver 4; and the signal source 14 frequency modulates information on the resonance radiation beam of lamp 2 which is retrieved as an amplitude modulated signal, amplified and detected by receiver unit 12. Since the beam contains no substantial amplitude modulation, it is not possible to intercept the information by ordinary photo-detectors.

It should be noted that the effective signalling wavelength lies in the infra-red region so that little attenuation by the atmosphere is encountered, and the visible portion of the beam may be filtered out so that there is no visible indication that information is being transmitted. Further, since the frequency spectrum of the beam is contained within narrow resonance lines, little background interference is encountered, even from direct sunlight, and the beam is capable of very sharp focusing.

In addition to helium, there exist other substances which are characterized by suitable spectral transitions from metastable levels. For example, strong signals have been observed with a series of lines from 6,000 to 9,000 angstroms in neon, argon, krypton and xenon. In the case of molecular transitions, in particular, the optical wavelengths of interest may extend upwards into the submillimeter range.

Also, alternative arrangements for monitoring the conductivity of a plasma of metastable atoms or molecules may be used. For example, the electrodes 11 may be omitted and the conductivity measured by the loading of the radio frequency coil 7, or the radio frequency excitation means 7 and 8 may be omitted and the metastable populations produced by an energy-selective electron gun.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A secure optical communication system comprising: source means including a substance for providing a beam of optical resonance radiation; means for frequency modulating information on said beam; a receiver for recovering said information including means for containing a plasma responsive to the frequency spectrum of said resonance radiation whereby changes in frequency vary the conductivity of such plasma, and means for monitoring the conductivity of said plasma.

2. The system of claim 1 wherein said plasma contains metastable levels of the same substance as that yielding said resonance radiation.

3. The system of claim 2 wherein said plasma is maintained in a glow discharge condition by electrodeless radio frequency excitation.

4. The system of claim 2 wherein said resonance radiation consists of the two-micron spectral line of helium.

5. The system of claim 2 wherein said resonance radiation consists of lines in the range between 6,000 and 9,000 angstroms in the spectrum of a member selected from the group consisting of neon, argon, krypton and xenon.

6. The system of claim 2 wherein said frequency modulating means includes means for establishing a variable magnetic field at said source means.

7. The system of claim 6 wherein said beam is directed perpendicularly to said field, and said receiver is provided with a linear polarizer for removing the component of said beam which is polarized parallel to said magnetic field.

8. The system of claim 7 wherein said variable field means includes means for establishing a bias field of magnitude sufficient to effect discriminator operation of said receiver.

9. The system of claim 8 wherein said resonance radiation consists of the two-micron spectral line of helium, and said bias is established at approximately 750 gauss.

10. The system of claim 9 wherein the maximum amplitude of the alternating component of said variable magnetic field is approximately 500 gauss.

References Cited by the Examiner

UNITED STATES PATENTS

| | | | |
|---|---|---|---|
| 2,025,912 | 12/1935 | Swart | 250—199 |
| 2,085,406 | 6/1937 | Zworykin | 332—57 |
| 2,265,784 | 12/1941 | Von Bayer | 250—7 |
| 2,712,069 | 6/1955 | Goldstein | 331—94 |
| 2,858,421 | 10/1958 | Touvet | 250—199 |
| 2,922,911 | 1/1960 | Friedman | 313—93 |
| 2,929,922 | 3/1960 | Schawlow et al. | 250—7 |

OTHER REFERENCES

"Magnetometer System" by Debolt, Electronics, vol. 33, No. 15, April 8, 1960, pp. 55–58.

DAVID G. REDINBAUGH, *Primary Examiner.*

GEORGE N. WESTBY, KATHLEEN H. CLAFFY, *Examiners.*

J. W. CALDWELL, *Assistant Examiner.*